United States Patent [19]

Almerini

[11] 4,105,836

[45] Aug. 8, 1978

[54] HIGH ENERGY DENSITY LITHIUM CELL

[75] Inventor: Achille L. Almerini, Middletown, N.J.

[73] Assignee: The United States of America as represented by the Secretary of the Army, Washington, D.C.

[21] Appl. No.: 804,684

[22] Filed: Jun. 8, 1977

[51] Int. Cl.$^2$ .............................................. H01M 6/14
[52] U.S. Cl. .................................... 429/194; 429/199
[58] Field of Search ............... 429/194, 196, 197, 199, 429/218

[56] References Cited

U.S. PATENT DOCUMENTS

| | | | |
|---|---|---|---|
| 3,514,337 | 5/1970 | Braeuer et al. | 429/194 |
| 3,536,532 | 10/1970 | Watanabe et al. | 429/194 |
| 3,852,113 | 12/1974 | Yokota et al. | 429/194 X |
| 4,042,756 | 8/1977 | Goebel et al. | 429/194 X |

Primary Examiner—Charles F. LeFevour
Attorney, Agent, or Firm—Nathan Edelberg; Sheldon Kanars; Roy E. Gordon

[57] ABSTRACT

A lithium-organic electrolyte electrochemical cell is provided in which lithium is the anode, a fluorographite of the formula $C_xF$ wherein $x$ is a value no less than one and no greater than 4.5 is the cathode, and a solution of about 0.5 molar to 1.5 molar of an inorganic lithium salt in a lower alkyl acetate is the electrolyte.

11 Claims, No Drawings

HIGH ENERGY DENSITY LITHIUM CELL

The invention described herein may be manufactured, used, and licensed by or for the Government for governmental purposes without the payment to me of any royalty thereon.

BACKGROUND OF THE INVENTION

This invention relates in general to lithium-organic electrolyte electrochemical cells and in particular to such electrochemical cells using a fluorographite as the cathode and a solution of an inorganic lithium salt in a lower alkyl acetate as the electrolyte.

It is known that lithium-organic electrolyte systems using a fluorographite as the cathode are suitable for reliable high energy density batteries for military equipments as diverse as sensors, communications, and night vision. One of the difficulties with such systems, however, has been their inadequate performance at low temperatures of about 0° F. For example, some of the previously used electrolyte solvents such as propylene carbonate yield fairly good results at moderate temperatures of about 80° F but the low temperature performance is greatly reduced by their high viscosity. Other electrolytes, such as dimethyl sulfite, though having good performance characteristics throughout the desired temperature range of 0° F to 80° F, are still not entirely adequate in view of their increased viscosity (lower wetting rate), their relative heaviness and their high cost.

SUMMARY OF THE INVENTION

The general object of the invention is to provide a lithium-organic electrolyte electrochemical system with a fluorographite cathode capable of delivering high energy densities throughout the temperature range of 0° F to 80° F. A further object of the invention is to provide such an electrochemical system that will be economic.

The foregoing objects have now been attained and a suitable electrochemical system provided by using a solution of an inorganic lithium salt in a lower alkyl acetate as the electrolyte.

The particular inorganic lithium salt used as the solute of the electrolyte is not critical. All that is required is that it be soluble in a lower alkyl acetate. Thus, inorganic lithium salts that can be used in the invention include lithium hexafluoroarsenate, lithium perchlorate, and lithium chloride. The use of lithium hexafluoroarsenate is preferred.

The concentration of the inorganic lithium salt in the lower alkyl acetate can be varied from about 0.2 molar to about 3.0 molar. A preferred concentration range is 0.5 molar to 1.5 molar.

The lower alkyl acetate used must dissolve the inorganic lithium salt. Those lower alkyl acetates that can be used include alkyl groups containing up to 3 carbon atoms, such as methyl acetate, ethyl acetate, and propyl acetate. The use of methyl acetate is preferred.

The fluorographite used as the cathode is of the formula $C_xF$ wherein $x$ has a value no less than one and no greater than 4.5. Thus, the fluorographites that can be used include highly fluorinated graphite such as CF and $C_2F$, and lesser fluorinated graphite such as $C_{3.5}F$ and $C_{4.5}F$. The use of the highly fluorinated graphite is preferred.

A sheet of lithium conveniently serves as the anode.

DESCRIPTION OF THE PREFERRED EMBODIMENT

A three-plate single cell is prepared with lithium as the anode, CF as the cathode, and an electrolyte of 0.75 molar lithium hexafluoroarsenate in methyl acetate. The net weight of the cell is 5.99 grams. When the cell is discharged at 2.0 milliamperes/cm² at 80° F, the following discharge data is obtained.

Averge volts: 2.19V
Amp Hrs : 0.664
Watt Hrs : 1.45
%CF efficiency = 80%

W.H./lb = 110

The experiment described above is repeated except that the cell is discharged at 32° F. The net weight of the cell is 5.87 grams. The following discharge data is obtained.

Average volts: 1.97V
Amp Hrs : 0.576
Watt Hrs : 1.13
%CF efficiency = 70%

W.H./lb = 87

A comparison of the results obtained indicate that the electrochemical system of the invention has a good performance over the temperature range from 32° F to 80° F.

I wish it to be understood that I do not desire to be limited to the exact details described, for obvious modifications will occur to a person skilled in the art.

What is claimed is:

1. A lithium-organic electrolyte electrochemical cell comprising lithium as the anode, a fluorographite of the formula $C_xF$ wherein $x$ has a value no less than one and no greater than 4.5 as the cathode, and a solution of about 0.5 molar to 1.5 molar of an inorganic lithium salt in a lower alkyl acetate selected from the group consisting of methyl acetate, and propyl acetate as the electrolyte.

2. An electrochemical cell according to claim 1 wherein $x$ has a value of 1.

3. An electrochemical cell according to claim 1 wherein $x$ has a value of 2.

4. An electrochemical cell according to claim 1 wherein $x$ has a value of 3.5.

5. An electrochemical cell according to claim 1 wherein $x$ has a value of 4.5.

6. An electrochemical cell according to claim 1 wherein the inorganic lithium salt is lithium hexafluoroarsenate.

7. An electrochemical cell according to claim 1 wherein the inorganic lithium salt is lithium perchlorate.

8. An electrochemical cell according to claim 1 wherein the inorganic lithium salt is lithium chloride.

9. An electrochemical cell according to claim 1 wherein the lower alkyl acetate is methyl acetate.

10. An electrochemical cell according to claim 1 wherein the lower alkyl acetate is propyl acetate.

11. An electrochemical cell according to claim 1 wherein the fluorographite is CF, and wherein the electrolyte is a 0.75 molar solution of lithium hexafluoroarsenate in methyl acetate.

* * * * *